United States Patent
D'Agostino et al.

(10) Patent No.: US 11,292,677 B2
(45) Date of Patent: Apr. 5, 2022

(54) CONVEYOR SLED ASSEMBLY

(71) Applicant: Proppant Express Solutions, LLC, Denver, CO (US)

(72) Inventors: Mark John D'Agostino, Bozeman, MT (US); Scott Joseph D'Agostino, Bozeman, MT (US); Chad Michael McEver, Houston, TX (US); Marc Kevin Fisher, Castle Rock, CO (US)

(73) Assignee: Proppant Express Solutions, LLC, Denver, CO (US)

( * ) Notice: Subject to any disclaimer, the term of this patent is extended or adjusted under 35 U.S.C. 154(b) by 14 days.

(21) Appl. No.: 16/850,989

(22) Filed: Apr. 16, 2020

(65) Prior Publication Data

US 2020/0239240 A1 Jul. 30, 2020

Related U.S. Application Data

(63) Continuation of application No. 15/264,352, filed on Sep. 13, 2016, now Pat. No. 10,633,201.

(51) Int. Cl.
| | |
|---|---|
| *B65G 65/42* | (2006.01) |
| *B65G 15/42* | (2006.01) |
| *B65G 69/18* | (2006.01) |
| *B60P 1/36* | (2006.01) |
| *B65G 15/30* | (2006.01) |

(52) U.S. Cl.
CPC ............ *B65G 65/42* (2013.01); *B60P 1/36* (2013.01); *B65G 15/30* (2013.01); *B65G 15/42* (2013.01); *B65G 69/18* (2013.01); *B65G 69/185* (2013.01); *B65G 2201/045* (2013.01)

(58) Field of Classification Search
CPC ........ B65G 2201/042; B65G 2201/045; B65G 65/42; B65G 69/185; B65G 69/18; B65G 15/30; B60P 1/36
USPC ............................................... 414/528
See application file for complete search history.

(56) References Cited

U.S. PATENT DOCUMENTS

| | | | | |
|---|---|---|---|---|
| 5,415,425 A | * | 5/1995 | Zerbe | B62D 53/065 |
| | | | | 280/417.1 |
| 2017/0190523 A1 | * | 7/2017 | Oren | B65C 11/00 |

* cited by examiner

*Primary Examiner* — Saul Rodriguez
*Assistant Examiner* — Willie W Berry, Jr.
(74) *Attorney, Agent, or Firm* — Fennemore Craig, P.C.

(57) ABSTRACT

A conveyor sled assembly is utilized to supply proppant in support of oilfield hydraulic fracturing operations. The conveyor sled assembly includes precisely positioned components where tolerances between components are so small as to prevent significant spillage at component junction boundaries. This manner of fitting proppant pods onto the conveyor sled assembly increases predictability of which pods will discharge their proppant load first. This enhances reliability of the overall proppant delivery system.

8 Claims, 10 Drawing Sheets

CONVEYOR SLED ASSEMBLY

RELATED APPLICATIONS

This application is a continuation of U.S. patent application Ser. No. 15/264,352 filed Sep. 13, 2016, which is incorporated by reference to the same extent as though fully replicated herein.

BACKGROUND

1. Field

The presently disclosed instrumentalities pertain to the field of conveyor systems and, more particularly, to conveyor systems used in the transport of granular materials such as sand or proppant in oilfield hydraulic fracturing operations.

2. Description of The Related Art

Hydraulic fracturing operations are a well-known way of stimulating production from wells, especially oil and/or gas wells. Generally speaking, surface equipment is used to mix a hydraulic fracturing fluid that includes a liquid or gel mixed with a proppant. The hydraulic fracturing fluid is pumped down a wellbore at high pressure sufficient to fracture reservoir rock that contains the oil or gas. A liquid component of the hydraulic fracturing fluid drains away to leave proppant residing in the hydraulically induced fractures. This creates a more permeable flow pathway capable of accelerating production of the oil or gas.

Recent advances in horizontal drilling have created a significant demand for the hydraulic fracturing of wells where the zone of interest through reservoir rock man some instances extend for over a mile. Large-scale hydraulic fracturing jobs may require several weeks to pump, and these jobs may consume several million pounds of proppant. The demands of these jobs for delivery of proppant may stress or overwhelm conventional proppant delivery systems United States Patent Publication 2014/03057692 Eiden et al. significantly advances the art by providing a conveyor sled assembly upon which are placed containers or pods filled with proppant. The pods discharge proppant onto the conveyor belt in a line where they drop their loads of sand. While significantly improving the densification of proppant storage on a drilling location, the Eiden system lacks fully automated controls and the mechanism by which sand is delivered to the conveyor belt is subject to spillage. It is also difficult for a forklift operator to ascertain which containers have discharged all of their proppant so that replacement of the container on the conveyor sled is required.

SUMMARY

The presently disclosed instrumentalities advanced the art by overcoming the problems outlined above. More specifically, the proppant-filled pods are placed on the conveyor in close tolerance with components of the conveyor such that spillage of sand is reduced. This manner of placement advantageously imposes a sequential order of discharge, such that the pod located at the farthest distance from a discharge chute drainage preferentially first, and so the nature of pod replacement is simplified.

According to one embodiment, a conveyor sled assembly has an elongate frame providing a plurality of individual loading stations along a length of the frame. A conveyor belt runs the length of the frame, and is operable for receipt of proppant from the individual loading stations and for delivery of the proppant to a discharge chute. The conveyor belt has sidewalls with interior partitions that rise upwardly from a loadbearing surface of the conveyor belt. Each of the loading stations having a first gate valve assembly positioned for discharge of proppant into the interior partitions of the conveyor belt. The first gate valve assembly resides in close proximity to the upper ends of the interior partitions of the conveyor belt. The tolerances of this junction are effective for preventing spillage of proppant in significant quantities at a lower junction between the first gate valve assembly and the upper ends of the interior partitions of the conveyor belt. The first gate valve assembly is positioned on the elongate frame to present an upper junction remote from the lower junction. This upper junction resides in a position of alignment with a proppant pod when the proppant pod is placed on the elongate frame such that the upper junction resides in close proximity to a discharge opening of the proppant pod with tolerances sufficient to prevent spillage of proppant in significant quantities through the upper junction.

In one aspect, the conveyor sled assembly may include at least one proppant pod residing on the elongate frame at one of the individual loading stations. The proppant pod has a gravitational discharge opening and a second gate valve governing flow of proppant from the discharge opening. The first and second gate valves may be, for example, of the ladder gate variety.

In one aspect, the frame and proppant pod may be provided with guide structure, such as flared or beveled corner mounts, that guide the pod into a position on the sled assembly. In one such example, the guide structure guides the pod into engagement with an intermodal pin system, such as are in use on transoceanic intermodal containers. The intermodal pin system permits precise mounting of the proppant pod on the elongate frame, facilitating achievement of the close tolerances between respective system components. The guide structure is optionally utilized in combination with a load cell that is utilized to assess when the pod is empty, having discharged its load onto the conveyor belt.

In one aspect, a programmatically controlled hydraulic cylinder may be provided for selective opening and closing of the first gate valve. There may also be a programmatically controlled electric motor configured to drive the conveyor belt. A controller and a control network are configured for operation of the hydraulic cylinder and the electric motor to control a rate of proppant delivery for purposes of conducting a hydraulic fracturing operation.

In one aspect, the conveyor sled assembly may be provided with a touchscreen for input of control instructions by an operator who, for example, may monitor the condition of the first gate valve, the filled/empty status of each pod, and control the speed of the electric motor or the position of the first gate valve. By way of example, the touchscreen system may ascertain the filled/empty status of each pod based upon electrical signals emanating from use of laser or photocell detectors, deformable springs, acoustic sensors, load cells, Doppler sensors, capacitance sensors, and vibrating wire sensors, where these signals embody a state of the pod ascertained as either total weight (the empty weight of each pod being known), acoustical resonance indicative of level of sand in the pod, or a binary status of flowable or empty based upon capacitance (resistance), optical transmissivity, or mass flow, In one aspect, a generator may be mounted on the elongate frame to power the electric motor.

In one aspect, the first gate valve may be provided with sensor circuitry such as optical, vibrating wire, acoustics, capacitance that are capable of ascertaining whether the first gate valve assembly contains proppant as an indicator whether the proppant pod is empty when the proppant pod resides on the elongate frame.

In one aspect, the proppant pod may be provided with a fiducial that is optically scannable to provide a unique identifier for the proppant pod to the control network. The controller is capable of associating this unique identifier with an empty status of the proppant pod and, consequently, provides a notification signal to a forklift operator that a particular proppant pod is empty needs to be replaced.

In various aspects, the elongate frame may include a plurality of telescoping legs for support of the elongate frame against the ground. The conveyor belt is operated in a direction that carries proppant from the plurality of individual loading stations towards the discharge chute and through the discharge chute. Due to the close tolerances of system components, the proppant pod farthest from the discharge chute will empty first. This is because that proppant pod is first to fill pockets of the conveyor belt with proppant. Since that proppant pod predictably discharges the most proppant, it will be the first one requiring replacement. Thus, the proppant pods fully discharge their respective loads in a predictably sequential manner.

In one aspect, the discharge chute may be preceded by a rising section of the conveyor belt that is shrouded by a conduit that is configured to mitigate spillage and provide a dust control function. A dolly may be attached to the elongate frame proximate the rising section of the conveyor belt. A fifth wheel connector may be mounted on the frame at a position remote from the dolly. The dolly and the fifth wheel connector provide, in combination, a mechanism for trailerless road transport of the conveyor sled assembly.

In one aspect, an unloading leg may be pivotally mounted to the elongate frame proximate the fifth wheel connector at a suitable position for facilitating mating engagement between the fifth wheel connector in the fifth wheel assembly of a truck under actuation of a selectively extensible cylinder.

In one aspect, skirting may be provided along the sides of the elongate frame for purposes of dust control. This skirting is preferably formed of metal plate material, which stiffens the frame of the sled assembly making it stronger.

DETAILED DESCRIPTION

Figure 1:
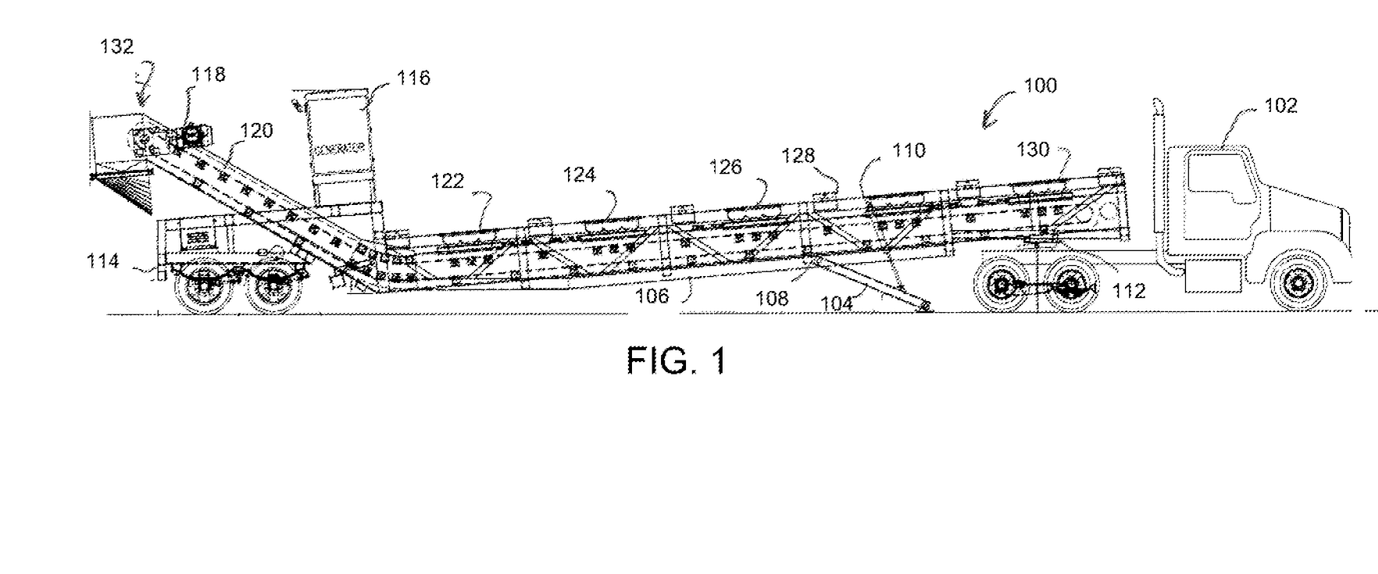
FIG. 1 shows a conveyor sled assembly mounted to a truck for road transport according to one embodiment.

FIG. 1 shows a conveyor sled assembly 100 detachably mounted to truck 102 for road transport. A landing jack 104 attaches to an elongate frame 106 at pivot 108. The landing jack 104 may be pivoted up or down by actuation of a hydraulic cylinder 110. As shown in FIG. 1, the hydraulic cylinder 110 is extending for purposes of supporting the frame 106 as the conveyor sled assembly 100 detaches from truck 102 at fifth wheel hitch 112. The fifth wheel hitch includes a pin mounted to the frame 106 and a receptacle mounted on truck 102 as is known in the art. Subsequently, at a point in time when it is desirable to reattach the conveyor sled assembly 100 at fifth wheel 112, the hydraulic cylinder 110 may be actuated to position the landing jack 104 in a manner that facilitates reattachment. A dual-axle dolly 114 advantageously supports the conveyor sled assembly 100 at a position remote from truck 102 in a manner such that no separate trailer is required for road transport of the conveyor sled assembly 100. The conveyor sled assembly 100 includes a generator 116 to provide power that drives electric motor 118 which, in turn, actuates a conveyor belt 120 that runs the length of conveyor sled assembly 100. The frame 106 includes a plurality of loading stations 122, 124, 126, 128, 130. These loading stations are built to receive containerized sand for use as proppant in oilfield hydraulic fracturing operations. These hydraulic fracturing operations are well known in the art and are used for purposes of stimulating production from oil and gas wells. The conveyor belt 120 receives proppant from the stations 122-130 and carries this proppant to a chute 132 that is built for discharging proppant into a blender (not shown). The blender combines this proppant with a fluid, such as water or a cross-linked wire gel, to provide a fractal that is pumped into a wellbore as is known in the art.

Figure 2:
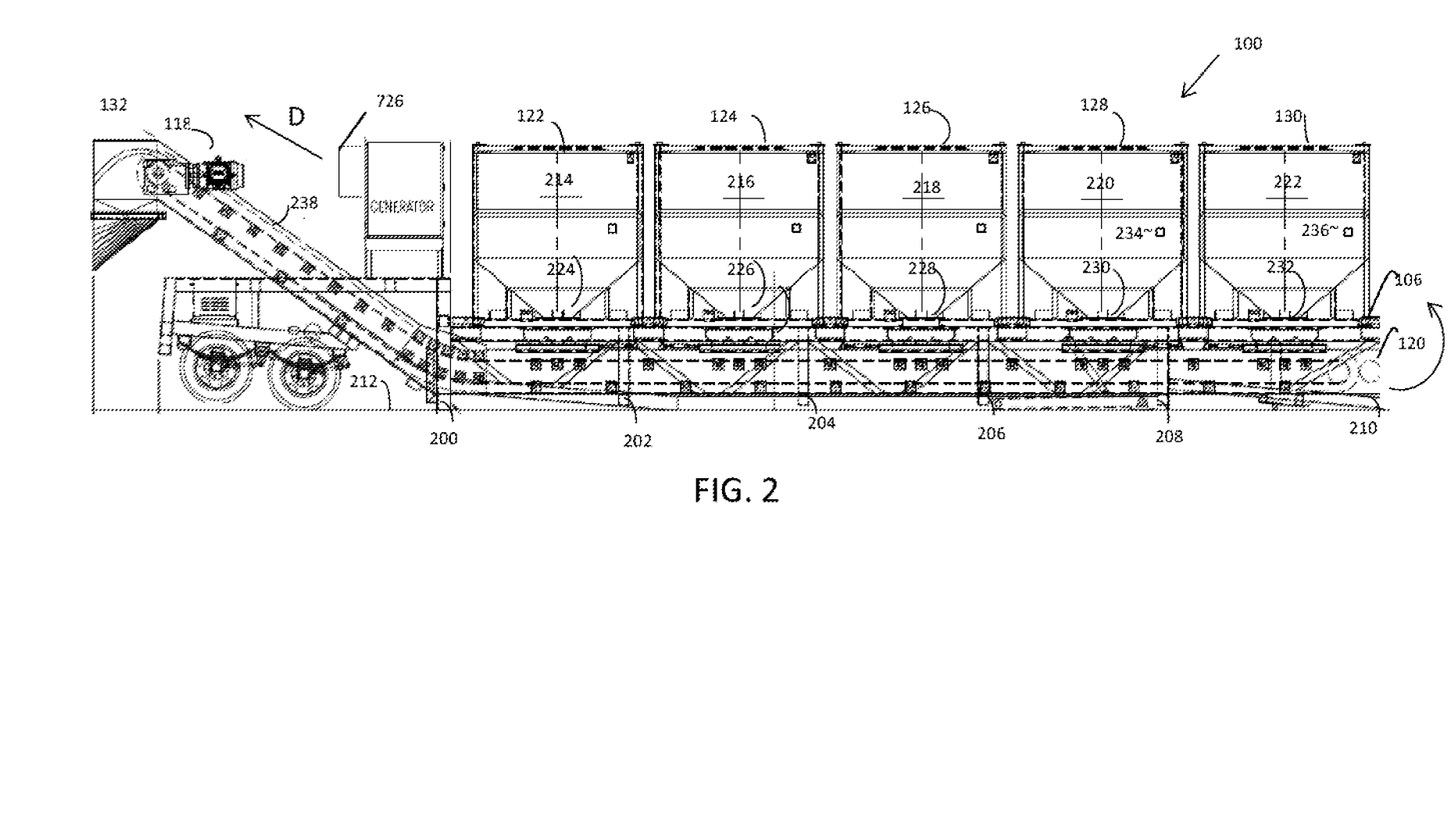
FIG. 2 shows the conveyor sled assembly demounted from the truck with a plurality of proppant pods in position for discharge of proppant onto a conveyor belt.

FIG. 2 shows the conveyor sled assembly 100 fully detached from truck 102. Posts 200, 202, 204, 206, 208, 210 are made of square channel iron, each containing telescopically received sliding members that may be manually extended and; pinned in place to contact the ground 212 for purposes of supporting frame 106. Each of the loading stations 122, 124, 126, 128, 130 have been loaded with a corresponding pod 214, 216, 218, 220, 222. The pods 214-222 are each filled with proppant that discharges onto belt 120 through a corresponding ladder gate 224, 226, 228, 230, 232. Each of pods 214-222 may be provided with data indicators 234, 236 providing a unique identifier for each pod that may be optically or automatically electronically scanned to facilitate status updates as to each pod. The data indicators 234.236 may be, for example, fiducials such as bar codes or quick response (QR) codes, RFID tags, or GPS transceivers, As shown in FIG. 2, the chute 132 has been pivoted forward for discharge of proppant to blender (not shown). An upwardly rising section 238 preceding chute 132 is covered with a conduit to prevent spillage and to provide dust control.

Figure 3:
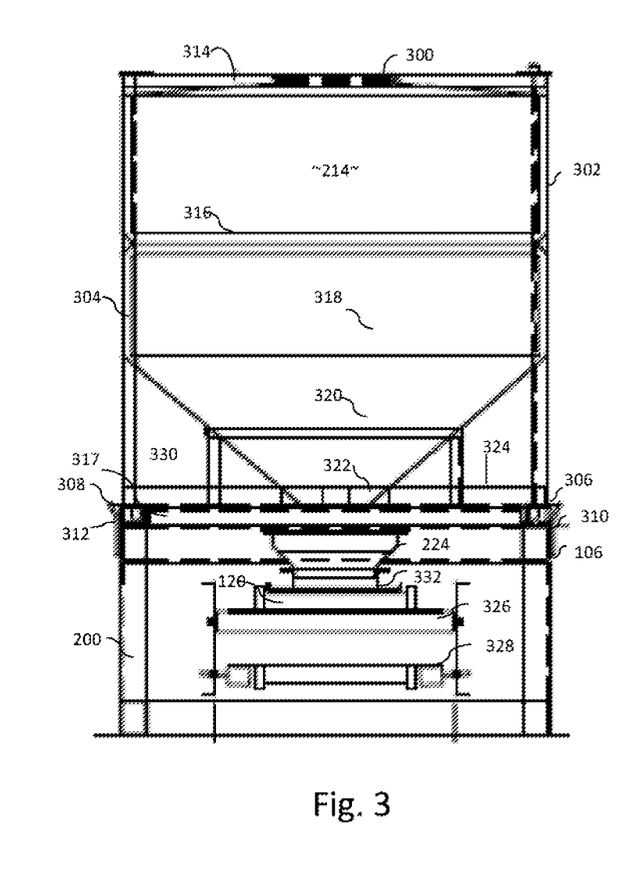
FIG. 3 is a mid-sectional rear view providing additional detail with respect to one of the proppant pods in position on the conveyor sled assembly.

FIG. 3 shows, by way of example, a rear view of pod 214 positioned on frame 106. Pod 214 has a central hatch 300 providing access to an interior (not shown) used for the storage of sand. Upright posts 302, 304 each have intermodal pin receivers 306, 308 at the bottom that mate with corresponding intermodal pins 310, 312 atop the frame 106. Alternately, the frame may include a right angle shaped guide that helps to position the pod more accurately on the frame. Two additional upright posts (not shown) exist forward of the post 302, 304. The posts 302, 304 support cross-beams 314, 316, 317. A sidewall 318, of which there are a total of four, descends from cross-beam 314 and inwardly tapering wall 320 that, in turn, descends to a discharge opening 322. A gate valve (not shown) seals the discharge opening 322 for road transport. The pod 214 includes the forklift tubes 324, which are used by a forklift operator to position the pod 214 on frame 106. The intermodal pinning arrangement precisely positions the pod 214 atop frame 106. Additional detail concerning this type of pod may be found in United States to Patent Publication 2014/030-5769 Eiden, which is incorporated by reference to the same extent as though fully replicated herein.

As shown in FIG. 3, the conveyor belt 120 resides on rollers 326, 328. Tolerances are such that any gaps between components are sufficiently small, such as less than ¼ inch, less than ⅛ inch, less than 1/16 inch or less than 1/32 inch, to prevent substantial leakage with spillage of sand. Thus, for example, junction 330 between discharge opening 322 and the top of ladder gate 224 is sized in this manner, as is junction 332 between the bottom of ladder gate 224 and the top of conveyor belt 120.

Figure 4:
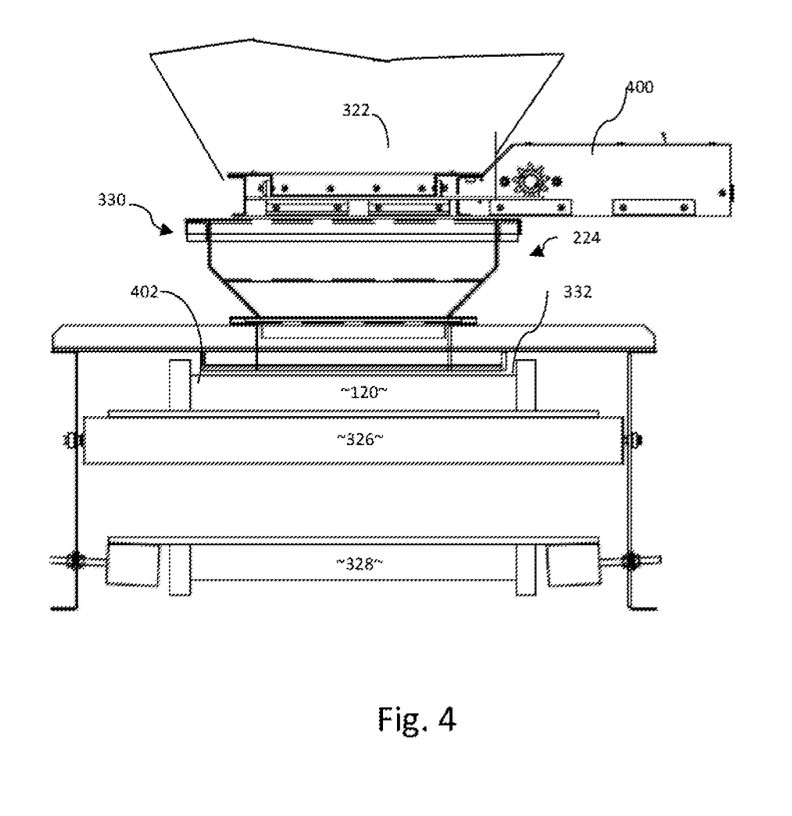
FIG. 4 provides additional detail of the conveyor sled assembly with respect to FIG. 3.

FIG. 4 provides additional detail with respect to what is shown in FIG. 3. A rack and pinion slide gate 400 shown in an open position permitting the discharge of proppant through discharge opening 322. The ladder gate 224 receives this proppant and functions as a conduit discharging into partitions 402 formed within the receiving surface of conveyor belt 120. There is no appreciable spillage of sand from junctions 330, 332 due to the closeness of tolerances of these junctions. The rack and pinion slide gate 400 may be purchased on commercial order.

Figure 5:
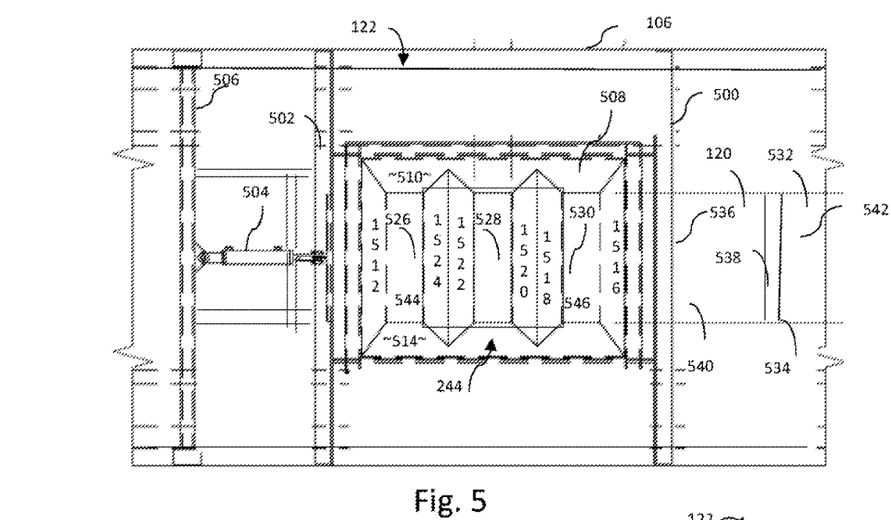
FIG. 5 is a top view showing a ladder gate assembly positioned for discharge of proppant onto a conveyor belt.

FIG. 5 is a top view providing additional detail with respect to the ladder gate assembly at discharge station 122. Cross members 500, 502 support the ladder gate assembly to 24 on frame 106A hydraulic cylinder 504 is mounted to a third cross-member 506 for actuation of a ladder gate (not shown). A conduit 508 includes tapered walls 510 512, 514, 516, 518, 520, 522, 524 leading to discharge openings 526, 528, 530 discharge onto conveyor belt 120. The conveyor belt 120 has rising sidewalls 532, 534 together with rising interior partitions 536, 538 forming pockets such as pockets 540, 542.

Figure 6:
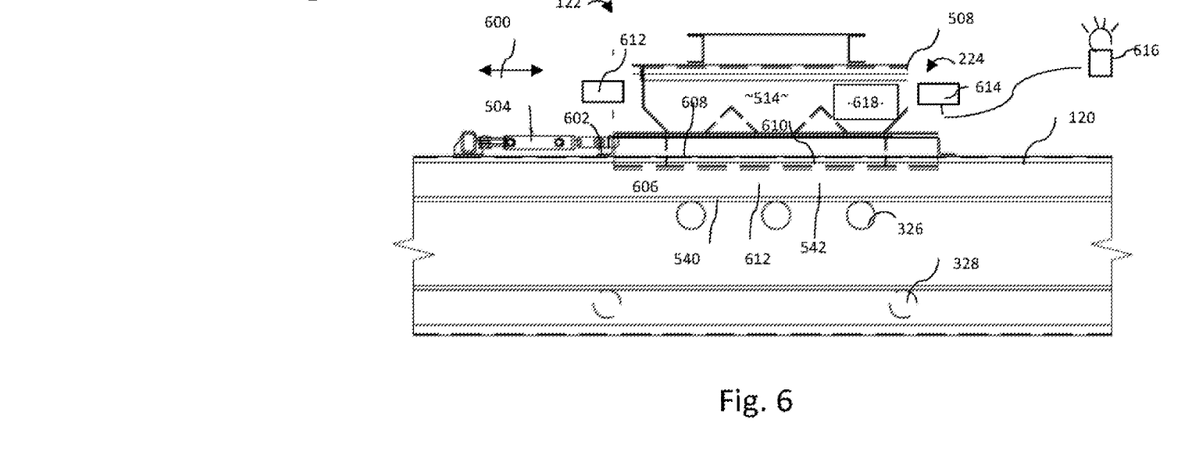
FIG. 6 is a right side view providing additional detail of the ladder gate assembly with respect to FIG. 5.

FIG. 6 provides additional detail from a side view of discharge station 122. The hydraulic cylinder 504 may be extended and retracted 600 to actuate a slide member 602 of the ladder gate assembly 224. This motion places panels 604, 606 either in an open configuration where the panels do not cover openings 608, 610 such that proppant 608 is fee to flow through the openings 608, 610, or else in a closed configuration where the panels 604, 606 cover the openings 608, 610 to block the flow of proppant.

Returning now to FIG. 2, it will be appreciated that under the arrangement shown in FIG. 6 the proppant from pod 222 must fully drain before it is possible for other proppant in pods 214, 216, 218, 220 to make a material contribution to the proppant load on conveyor belt 120. This is because, as shown in FIG. 6, proppant in pockets 540, 542 completely fills those pockets so there is essentially no room for additional proppant to enter pockets 540, 542. Because the pods sequentially drain in this manner, small holes 544, 546 may be formed in walls 512, 516 (FIG. 5). The dimensions of these holes 544, 546 are such that they do not permit appreciable leakage of proppant. A laser 612 is positioned to emit light through holes 544, 546 towards photo detection cell 614. The laser light on this optical pathway will normally be blocked by proppant within the letter gave 7224. However, when pod 214 has discharged its entire proppant load to the conveyor belt 120, the optical pathway will no longer be blocked. It will be appreciated that there may be quite a bit of dust in the intended environment of use, and this dust will cause Mie scattering of the laser light which reduces the intensity of signal obtainable from photo detection cell 614. This problem may be overcome by utilizing a laser with sufficient power to overcome the scattering effect and/or to enhance this effect. Moreover, as shown in FIG. 6, the photo detection cell 614 is positioned in a straight line pathway from laser 612 alternatively, this pathway may be arranged to measure Mie phenomenon of backscattering, for example, by placing the photo detector cell 614 immediately adjacent to the laser 612, or on any other backscattering pathway that is not a direct line to the photo detector 614. This results in electronic signal emanating from the photodetector 614 as an indicator that the pod 214 is empty. The photodetector may be constructed and arranged to provide a wireless signal that touchscreen 726 may interpret as indicating that the pod 214 is empty.

Figure 7:
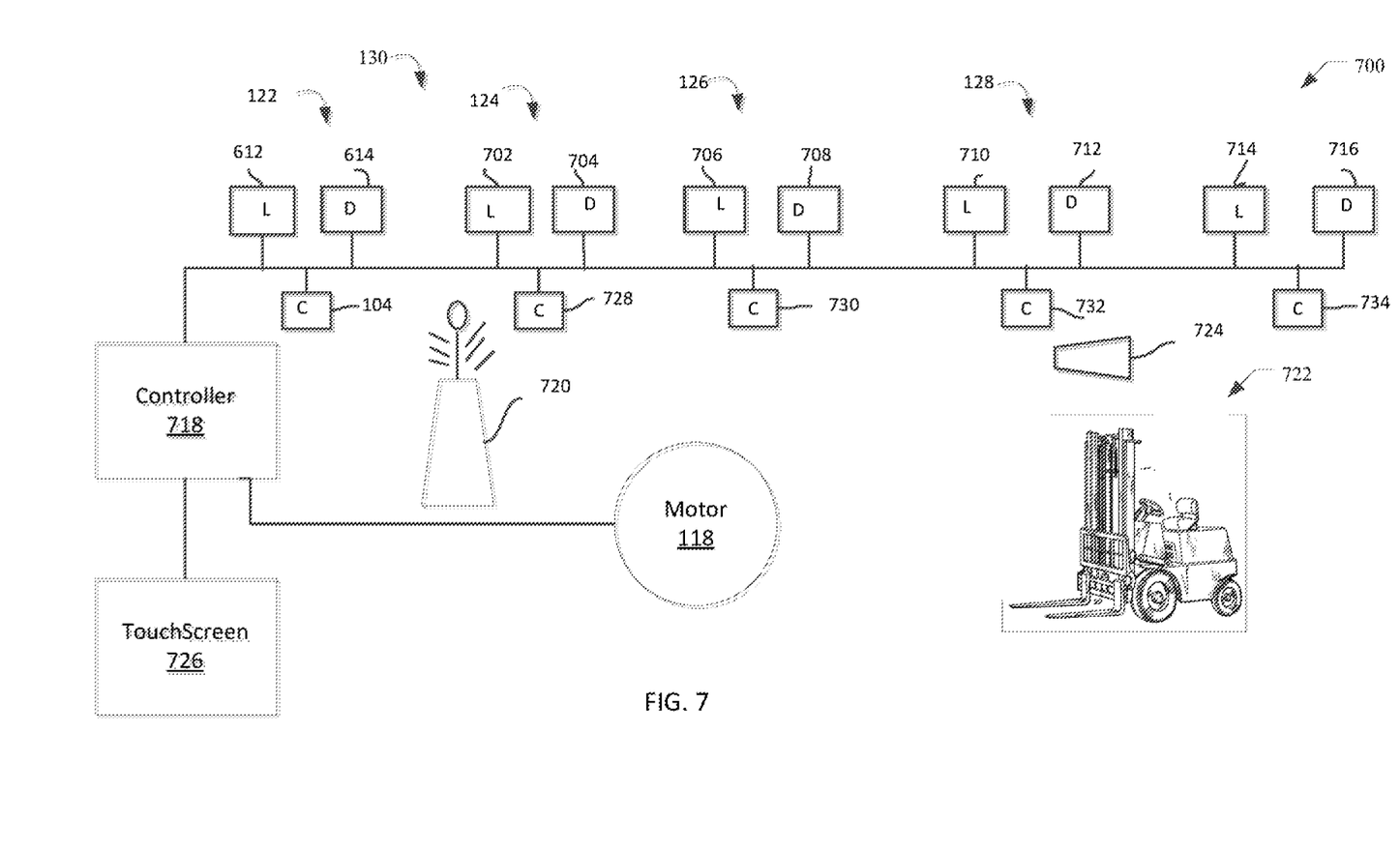
FIG. 7 is a schematic diagram of control circuitry governing operation of the conveyor sled assembly.

It follows that, in normal operation, the pod at discharge station 130 will most frequently empty, necessitating replacement with a full pod. Circuitry at other loading stations will signal for pod replacement less often. FIG. 7 is a schematic diagram of electronic controls for operating the conveyor sled assembly 100. Each of the proppant discharge stations 122-130 is provided with a laser-detector pair similar to laser 612 and photodetector 614. Thus, there are lasers 702, 706, 710, 714 with corresponding photodetectors 704, 708, 712, 716. These are networked with controller 718, for example, using a car area network (CAN), Ethernet, or other suitable networking system. The controller 718 may for example reside in a control van that is a central hub for the overall conduct of a hydraulic fracturing operation. The controller 718 receives signals from the laser-detector pairs indicating whether a particular discharge station is empty of proppant if so, the controller 718 emits a wireless signal which may be done using a workover Wi-Fi 720, Bluetooth, or other short-range radio transmission. In one aspect, this signal may notify the operator of a forklift 722 of a need to replace an empty pod located at one of the discharge stations 122-130. This is possible because the forklift 722 is equipped with a scanner/transceiver 724 that telecommunicates with the workover Wi-Fi 720. The operator of forklift 722 scans the data indicators 234, 236 of each pod as the pod is placed on or removed from the conveyor sled assembly 100. Alternatively, it is not strictly necessary to notify the control van of an empty pod. The output signal from detector 614 may activate an indicator light 616 that flashes brightly to show the forklift operator when the pod is empty and needs to be replaced.

Although FIG. 6 shows use of a laser-detector pair 612, 614, other sensors may be used, either alone or in combination with the laser-detector pair 612, 614. Thus, a mass flow detector 618 may be used to detect the presence of flow within conduit 508, and signals emanating from the mass flow detector 618 may be used for the notification purposes as described above. The mass flow detector 618 may be replaced by any other type of suitable sensor including, among others, laser or photocell detectors, acoustic sensors, load cells, Doppler sensors, capacitance sensors, positive displacement meters, and vibrating wire measurements. Level indicators utilized in this application may include, for example, rotating wheels or bayonet paddle sensors, such as those made by BinMaster of Lincoln, Nebr.

The operator scans data indicators 234, 236 to identify each pod as the pod is placed onto or off the sled assembly 100. The scanner/transceiver 724 is optionally programmed to provide this identification data to controller 718, along with the pod status, through use of workover WiFi 720. This notifies the controller 718 of the change in status for each container each time the container is moved or repositioned. By way of example, the forklift operator may scan a QR code on the pod as he takes it off the "full" pile to place the pod on sled assembly 100. Once the pod has discharged its proppant load, the operator scans the QR code again when removing the pod from the sled assembly 100 to place the pod on the "empty" pile.

A touch screen 726 may be provided to accept operator input from a different operator who controls the conveyor sled assembly 100. Thus, the touchscreen 726 may be mounted on the conveyor sled assembly 100 (see FIG. 2) or in a separate van (not shown) housing the controls for the entire hydraulic fracturing operation. Operator interaction with touch screen 726 may direct controller 718 to increase or decrease the speed of electric motor 118. Operator interaction with touch screen 726 may also actuate hydraulic cylinders, such as hydraulic cylinder 104, for the actuation of ladder gate assembly 224. The discharge stations 124-130 are each provided with a corresponding hydraulic cylinder 728, 730, 732, 734 for automated control of proppant discharge from each station. Thus, one or more second operators may utilize the touchscreen 726 to assess and control such factors as current sand supply by volume, rate of sand consumption based upon rate of pod replenishment, sand reserve capacity, and status of sand weight and movement in each pod. This provides the operators with an unprecedented ability to call for more proppant volume based on real time use data, and to control the sand flow directly from the control van.

While it is generally envisioned that the status of the corresponding ladder gate assemblies at each of these discharge stations will be either fully open or fully closed, what is shown provides an ability to control each of the discharge stations 122-130. The ability to control the speed of motor 118 by interaction with touch screen 726 permits, for example, a predictably controllable mass flow rate of sand delivered through the chute 132 in accordance with design parameters for a staged hydraulic fracturing operation. The controller 718 may have a control option to adjust the speed of motor 118 in accordance with these design parameters without necessarily having to receive input from touch screen 726.

Figure 8:
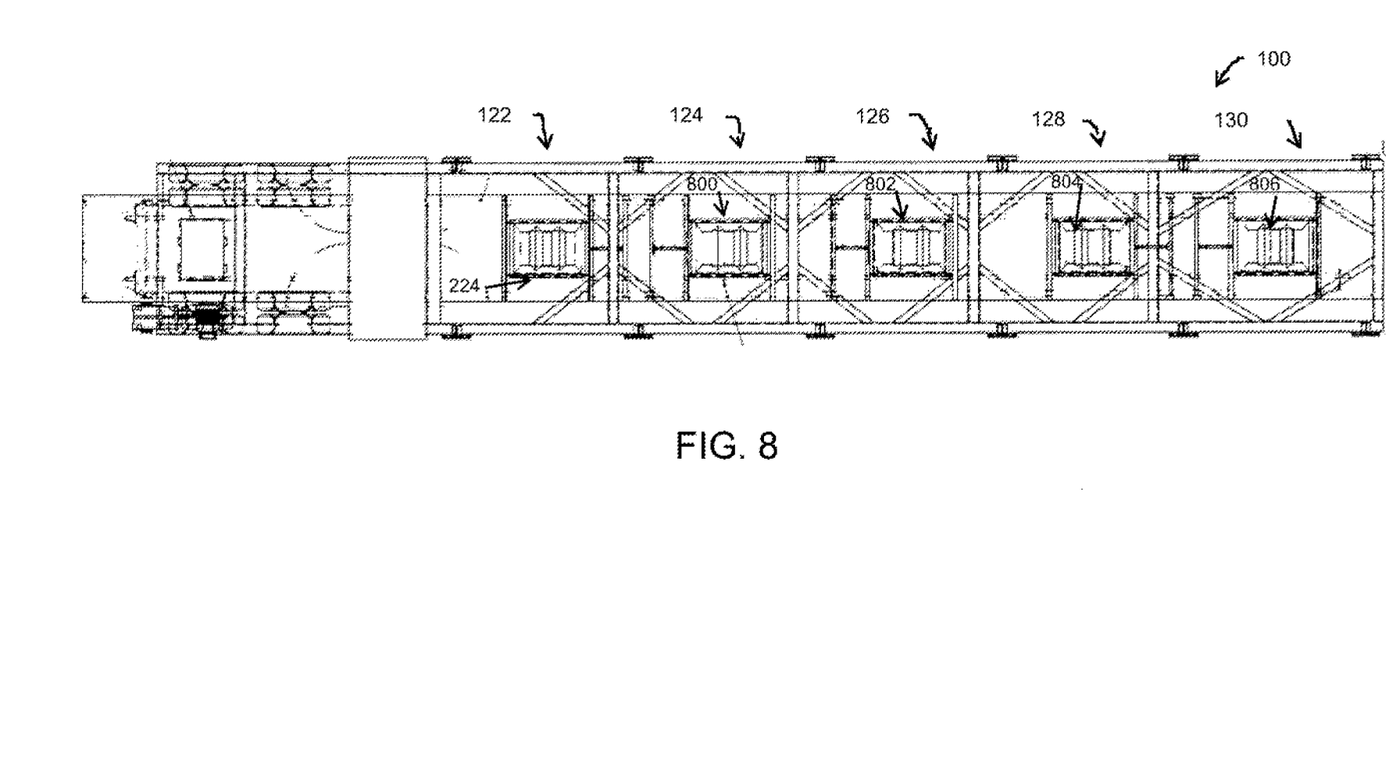
FIG. 8 is a top plan view of the conveyor sled assembly.

FIG. 8 is a top plan view of the conveyor sled assembly 100 showing that the ladder gate assembly of loading station 122 is serially replicated as ladder gate assemblies 800, 802, 804, 806 at the respective loading stations 124, 126, 128, 130. of the loading stations 124, 126, 128.

Figure 9:
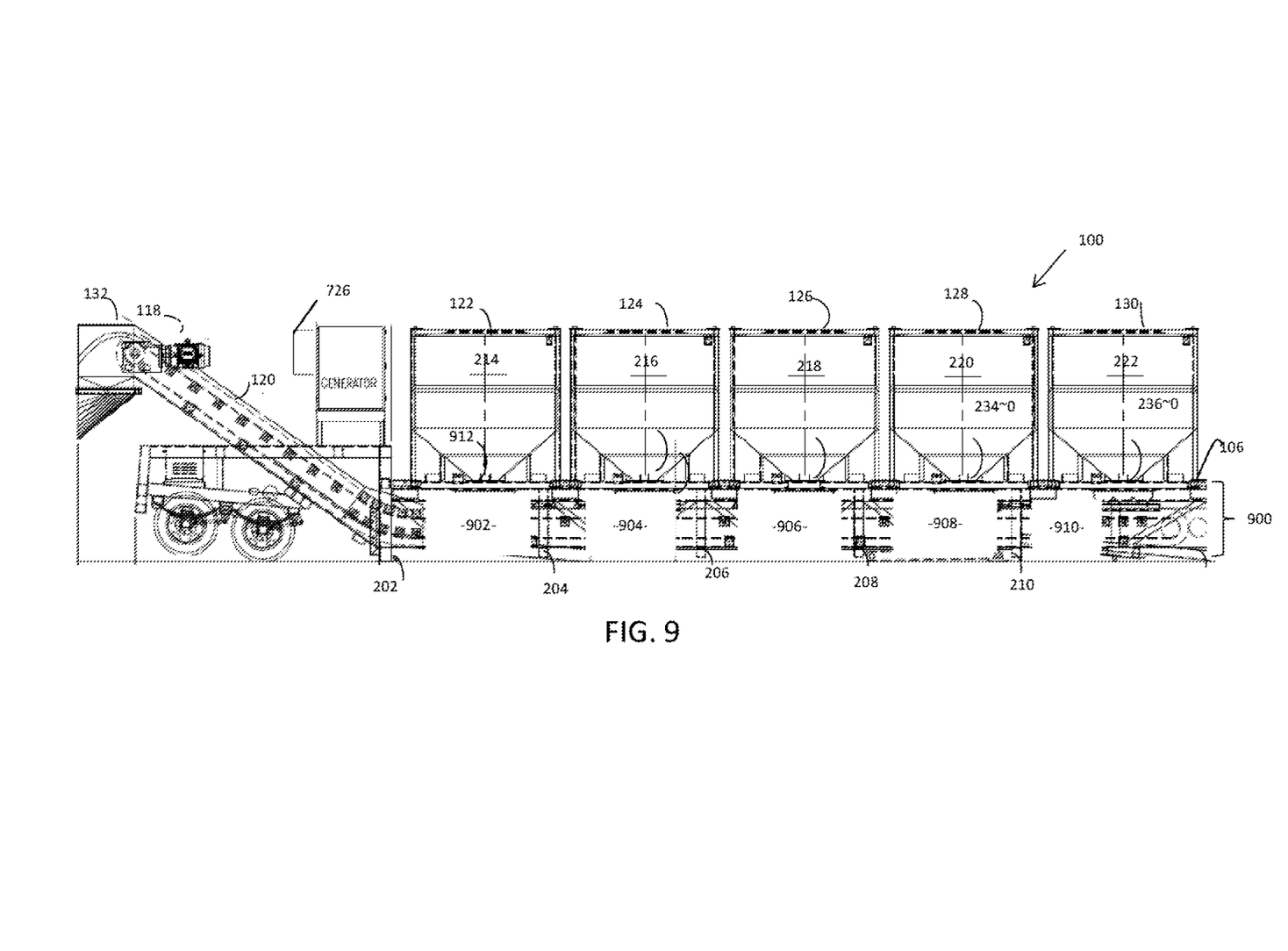
FIG. 9 shows the conveyor sled assembly with skirting attached for purposes of duct control.

FIG. 9 shows the conveyor sled assembly 100. The entire lower perimeter 900 is covered with steel skirting panels, such as panels 902, 904, 906, 908, for purposes of controlling/containing dust that may emanate from the conveyor belt 120. The skirting panels 902-908 also rigidify the sled assembly 100. This is accomplished by welding or bolting the skirting panels 902-908 to the frame 1061, as well as legs 202, 204, 206, 208, 210 together with cross-members, such as cross-member 912.

Figure 10:
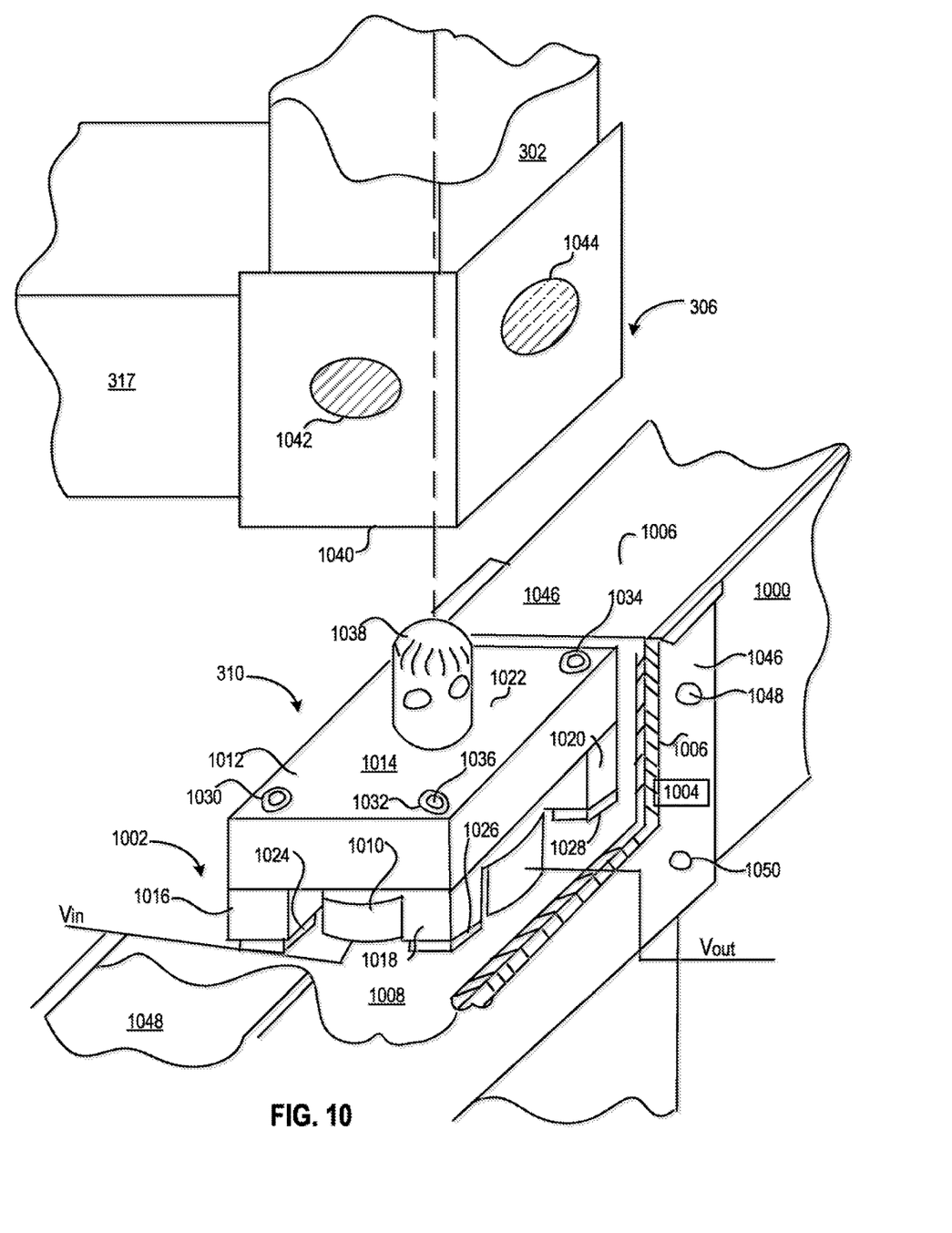
FIG. 10 shows a load cell mounted as part of the conveyor sled assembly.

FIG. 10 provides additional detail concerning the intermodal receiver-pin assembly 306, 310, as shown in FIG. 3 according to one embodiment. A rail 1000 of the sled frame 106 has a rectilinear cavity 1002 formed therein including sidewalls 1004, 1006 and bottom wall 1008. A load cell 1010 resides on the bottom wall 1008. The frame 106 has a power grid providing voltage $V_{In}$ to the load cell 1010, which provides an output signal $V_{OUT}$ representative of load that is placed on the load cell 1010. The $V_{OUT}$ signal may go, for example, to the touchscreen 726 for communication to sled operator or the forklift operator, as well as the controller 718. Programmable circuitry in the touchscreen may be programmed to interpret when a particular pod is empty and activate the indicator light 616. The load cell 1010 may be, for example, a hydraulic load cell or a pneumatic load cell, but is preferably a strain load cell and may be a commercially available transducer-based cell. The load cell 1010 is capable of sensing the amount of weight received on platen block 1012.

The platen block 1012 may, for example, be of integral construction machined from a block of steel. Face 1014 is arranged to receive weight directly from receiver block 306. Four legs, such as legs 1016, 1018, 1020 descend from a rectilinear main body 1022. Each of the legs 1016-1020 has a corresponding elastomer 1024, 1026, 1028 adhered at the bottom thereof and resting on bottom wall 1008. Recesses 1030, 1032, 1034 each have corresponding collar bolts, such as bolt extending through the leg 1018 with threads extending from the bottom of the collar bolt into the frame (not shown). The collar bolt 1036 presents its collar to the interior of leg 1010 in a manner such that the leg 1018 may freely ride up and down on the collar bolt 1036. Thus, the load from platen block 1012 is freely transferred to the load cell 1010 for sense operations, and the bolts such as bolt 1036 retain the platen block 1012 in place within the cavity 1002. A pin 1038 protrudes upwardly from face 1014 and presents itself to the pin receiver 306.

A bottom 1040 of the pin receiver 306 has a female receptacle (not shown) for receipt of the pin 1038. Apertures 1042, 1044 communicate with is opening and are optionally provided with internal threads. The internal threads accommodate a bolt or large allen screw to engage similar pins to lock the pods down for purposes of transport; however, the embodiment shown in FIG. 10 does not require this type of bolt or allen screw.

Face 1014 resides slightly higher in elevation than top surfaces 1046, 1048 of frame 106. This permits the platen block 1012 to take the full load from pin receiver 306. Each corner of pod 214 (see FIG. 3) is associated with a corresponding version of load cell 1010, and the readings from these load cells as represented in the respective signals $V_{OUT}$ total to provide the weight of a pod at any one of discharge stations 122 to 130 (FIG. 1).

Figure 11:
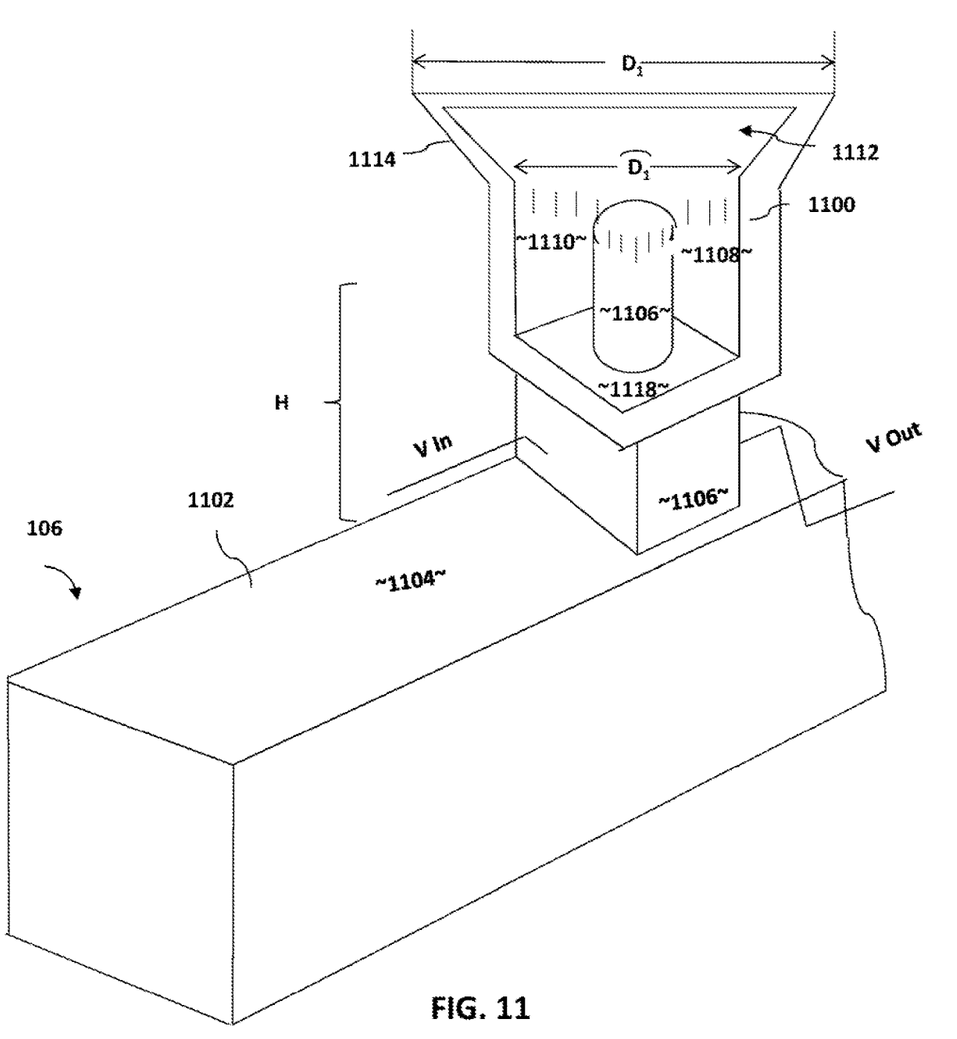
FIG. 11 shows a load cell and guide bracket mounted as part of the conveyor sled assembly.

FIG. 11 shows an alternative embodiment that includes a guide bracket 1100 that may be replicated with proper orientation for any bottom corner of a pod, such as pin receiver 306 (shown above). A rail 1102 of the sled frame 106 has a top surface 1104. This top surface 1104 differs from that of other rails shown above in that the top surface 1104 does not directly support the weight of a pod. Instead, a load cell 1106 is interposed between the top surface 1104 and the guide bracket 1100. The frame 106 has a power grid providing voltage $V_{in}$ to the load cell 1106, which provides an output signal $V_{OUT}$ representative of load that is placed on the load cell 1010. The $V_{OUT}$ signal may go, for example, to the touchscreen 726 for communication to sled operator or the forklift operator, as well as the controller 718.

Programmable circuitry in the touchscreen may be programmed to interpret when a particular pod is empty and activate the indicator light 616. The load cell 1106 is preferably a strain load cell and may be a commercially available transducer-based cell. The load cell 1106 is capable of sensing the amount of weight received on guide bracket 1106 and provides $V_{OUT}$ signals representing that weight. The guide bracket 1100 may be adhered or bolted to the load cell 1106 which, in turn, is adhered or bolted to the rail 1102. The guide bracket includes walls 1108, 1110, which may be oriented generally at a right angle to one another, or in the alternative, may flare upwardly towards top opening 1112. The walls 1110, 1112, are capped by a radially outboard flare 1114. An optional intermodal pin 1116 rises from surface 1118.

The operational principle of guide bracket 1100 is that a forklift or other loader operator will have a range of positioning error when placing pods onto the sled assembly 106, as represented by distance D1 diagonally across the guide bracket 1100. Moreover, the pod may be canted. The guide bracket 1100 defines an inwardly tapering contact surface that repositions the pod within a closer tolerance of distance D2 as the pod is lowered over intermodal pin 1116. While the intermodal pin 1116 is not strictly necessary, the pin 1116 does provide an even closer alignment with conduit 508 for purpose described above. It will be appreciated that in the embodiment of FIG. 11 the conduit 508, conveyor belt 120 and other features of sled assembly 100 may be raised above surface 1104 to accommodate the height H between top surface 1104 and bottom surface 1118. Each corner of pod 214 (see FIG. 3) is associated with a corresponding version of load cell 1010, and the readings from these load cells as represented in the respective signals $V_{OUT}$ total to provide the weight of a pod at any one of discharge stations 122 to 130 (FIG. 1).

Figure 12:
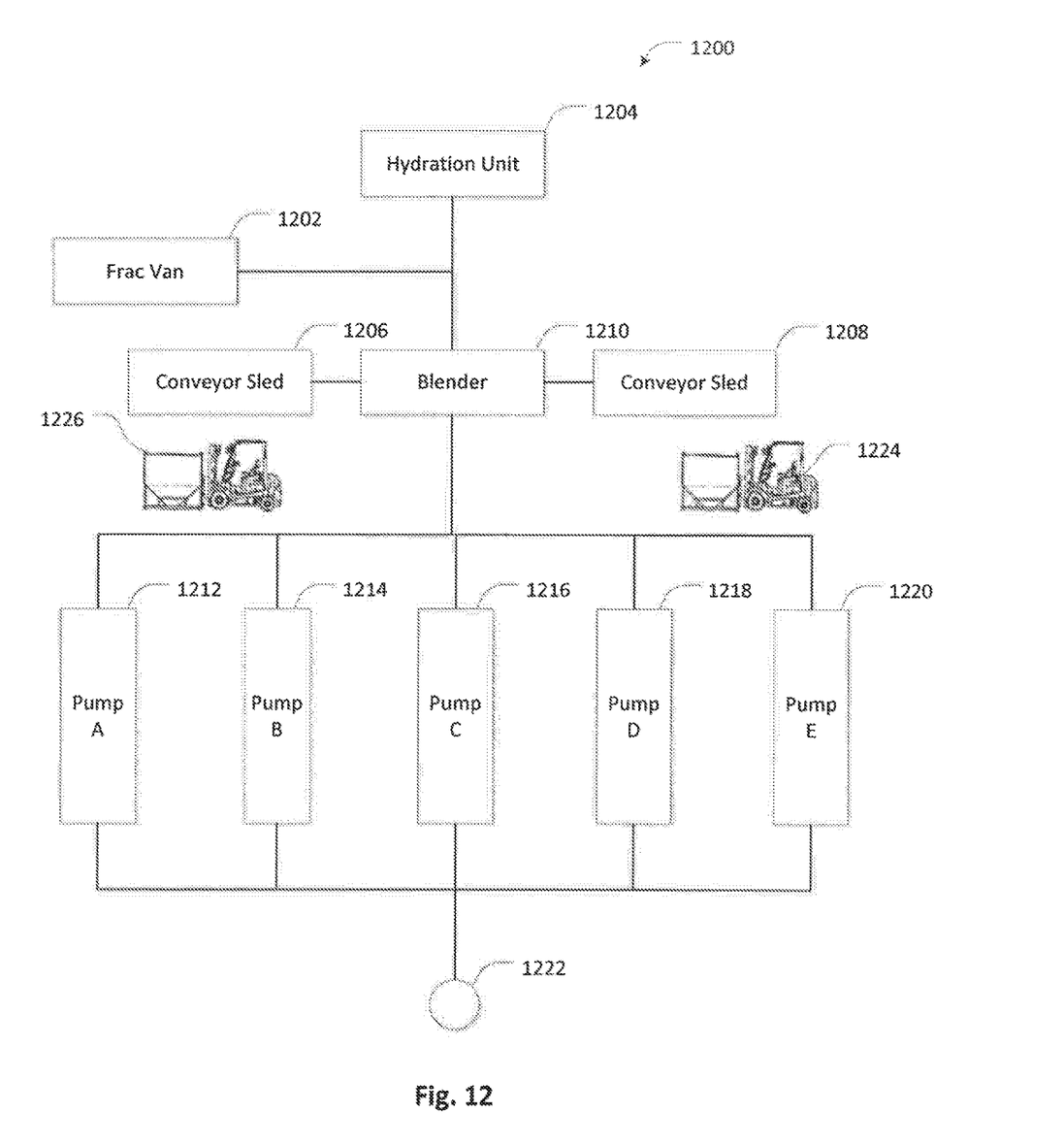
FIG. 12 shows an automated system including the conveyor sled assembly configured for use in a hydraulic fracturing operation.

FIG. 12 shows a system 1200 under automated control of frac van 1202. A hydration unit 1204 provides liquid in support of a hydraulic fracturing operation to blender 1210. This liquid may be, for example, water, diesel, cross-linked guar gel, or a combination of these materials. Conveyor sled assemblies 1206, 1208 may be the same as conveyor sled assembly 100, which is described above. The conveyor sled assemblies 1206, 1208 supply proppant to blender 1210 for mixing with the liquid from hydration unit 1204. Blender 1210 combines the proppant and liquid to form a fracturing fluid that is supplied to any number of tandem pumping units 1212, 1214, 1216, 1218, 1220. The pumping units 1212-1220 increase the pressure of the fracturing fluid and deliver the fluid at elevated pressure to well 1222 for stimulation thereof according to a plan for hydraulic fracturing. Design, planning and scheduling of a hydraulic fracturing job may be performed utilizing commercially available software is available for this use, such as FracproPT from Carbo Ceramics or STIMPLAN™ from NSI of Tulsa, Okla. The frac van 1202 is in radio communications with forklift operators 1224, 1226 to assist operational stacking of containers on the conveyor sled assemblies 1206, 1208, especially when the frac van 1202 signals from sense operations, as described above, indicating that a particular container is empty.

The frac van 1202 contains a computer including a central processing unit, memory, and data storage. Each of the system components 1204 to 1220 is an intelligent network node that is able to accept and execute automated operational instructions from the frac van 1202. Thus, the frac van 1202 is able to control: (1) the volume of fracturing fluid delivered to well 1222 through pumping units 1212-1220 according to a design for a hydraulic fracturing operation; (2) the respective volumes of proppant and liquid that pass through blender 1210 such that the volume of fracturing fluid delivered to the well 1222 contains appropriate amounts of liquid and proppant accord ng to design parameters; (3) speed of the conveyor belts of the conveyor sled assemblies 1206, 1208 to provide the requisite rate of sand as needed for proportionate mixing with liquid from the hydration unit 1204, and (4) the rate of liquid provided by the hydration unit 1204 as needed for proportionate mixing with proppant from conveyor sled assemblies 1206, 1208. According to one embodiment, the respective touchscreens 726 on conveyor sled assemblies 1206, 1208 may be used to override certain control instructions from the frac van 1202, such as conveyor belt speed, with the frac van taking appropriate action in response. By way of example, if an operational problem arises such that a conveyor belt needs to stop rotating, the frac van 1202 is able to compensate or adjust overall system performance according to established expectations under a set of expert rules.

Those skilled in the art understand that what is disclosed may be subjected to insubstantial changes without departing from the scope and spirit of the invention. Accordingly, the inventors hereby state their intention to rely upon the doctrine of equivalents, if needed, in protecting their full rights under what is claimed.

We claim:

1. A conveyor sled system comprising:
    an elongate frame providing a plurality of individual loading stations along a length of the frame;
    a conveyor belt running the length of the frame,
    a proppant pod residing on the elongate frame at one of the individual loading stations, the proppant pod being a discrete unit that is selectively removable from the conveyor during normal conduct of a hydraulic fracturing operation,
    the conveyor belt being operable for receipt of proppant from the individual loading stations and for delivery of the proppant to a discharge chute,
    the conveyor belt having sidewalls with interior partitions that rise upwardly from a loadbearing surface of the conveyor belt;
    each of the loading stations having a first gate valve assembly positioned for discharge of proppant into the interior partitions of the conveyor belt,
    the first gate valve assembly residing proximate a first gap in close proximity to the upper ends of the interior partitions of the conveyor belt,
    the first gap presenting a first tolerance ranging from ¼ to ¹⁄₃₂ of an inch, the first tolerance being effective for preventing spillage of proppant in significant quantities at a lower junction residing below the first gate valve assembly and between the first gate valve assembly and the upper ends of the interior partitions of the conveyor belt.

2. The conveyor sled system of claim 1, wherein
    the first gate valve assembly is positioned on the elongate frame to present an upper junction above the gate valve assembly remote from the lower junction,
    the upper junction residing in a position of alignment with a proppant pod when the proppant pod is placed on the elongate frame such that the upper junction resides in close proximity to a discharge opening of the proppant pod across a second gap at the upper junction with second tolerances effective for preventing spillage of proppant in significant quantities through the upper junction.

3. The conveyor sled system of claim 2, wherein the first and second tolerances range from ¼ to ¹⁄₃₂ of an inch.

4. The conveyor sled assembly of claim 1 wherein the conveyor belt assembly includes a discharge chute and the conveyor belt is operated in a direction that carries proppant from the plurality of individual loading stations towards the discharge chute and through the discharge chute.

5. The conveyor sled assembly of claim 4 wherein the discharge chute is preceded by a rising section of the conveyor belt that is shrouded by a conduit that is configured to mitigate spillage and provide a dust control function.

6. The conveyor sled assembly of claim 5 further including a dolly attached to the elongate frame proximate the rising section of the conveyor belt, and a fifth wheel connector mounted on the frame at a position remote from the dolly, the dolly and the fifth wheel connector providing, in combination, a mechanism for trailerless road transport of the conveyor sled assembly.

7. The conveyor sled assembly of claim 6 further comprising a truck having a fifth wheel assembly built for mating engagement with the fifth wheel connector, the conveyor sled assembly including an unloading leg the unloading leg being pivotally mounted to the elongate frame proximate the fifth wheel connector at a suitable position for facilitating mating engagement between the fifth wheel connector and the fifth wheel assembly of the truck, the unloading leg having a pivotal range of motion permitting the unloading leg to contact a ground surface for establishing ground-based support of the elongate frame on the unloading leg;

there being a selectively extensible cylinder provided for pivoting of the unloading leg according to the pivotal range of motion.

8. The conveyor sled assembly of claim 1 further comprising skirting rigidly affixed to the elongate frame for rigidification thereof, the skirting also being constructed and arranged for purposes of dust control.

\* \* \* \* \*

UNITED STATES PATENT AND TRADEMARK OFFICE
CERTIFICATE OF CORRECTION

PATENT NO. : 11,292,677 B2
APPLICATION NO. : 16/850989
DATED : April 5, 2022
INVENTOR(S) : D'Agostino et al.

It is certified that error appears in the above-identified patent and that said Letters Patent is hereby corrected as shown below:

In the Specification

Column 1, Line 35 the text "rock man some" should be --rock may in some--
Column 1, Line 40 the text "systems" should be --systems.--
Column 3, Line 13 the text "empty needs" should be --empty and needs--
Column 4, Line 58 the text "234.236" should be --234, 236--
Column 5, Line 55 the text "608 is fee to" should be --608 is free to--
Column 5, Line 65 the text "fills those pockets" should be --fill those pockets--
Column 6, Line 6 the text "7224" should be --224--
Column 6, Lines 38-39 the text "may for example reside" should be --may, for example, reside--
Column 6, Line 43 the text "proppant if so," should be --proppant. If so,--
Column 7, Line 9 the text "WiFi" should be --Wi-Fi--
Column 8, Line 28 the text "as bolt extending" should be --as bolts extending--
Column 8, Line 40 the text "with is opening" should be --with its opening--
Column 9, Line 59 the text "indicating" should be --indicate--
Column 9, Line 63 the text "node" should be --mode--
Column 10, Line 4 the text "accord ng" should be --according--

Signed and Sealed this
Twelfth Day of July, 2022

Katherine Kelly Vidal
*Director of the United States Patent and Trademark Office*